(12) United States Patent
Asanuma (10) Patent No.: US 9,068,536 B2
(45) Date of Patent: Jun. 30, 2015

(54) EXHAUST GAS RECIRCULATION APPARATUS

(71) Applicant: AISAN KOGYO KABUSHIKI KAISHA, Obu-Shi, Aichi (JP)

(72) Inventor: Hiroshi Asanuma, Chita (JP)

(73) Assignee: ASIAN KOGYO KABUSHIKI KAISHA, Obu-Shi (JP)

( * ) Notice: Subject to any disclaimer, the term of this patent is extended or adjusted under 35 U.S.C. 154(b) by 471 days.

(21) Appl. No.: 13/655,091

(22) Filed: Oct. 18, 2012

(65) Prior Publication Data
US 2013/0112178 A1    May 9, 2013

(30) Foreign Application Priority Data

Nov. 8, 2011 (JP) ................................. 2011-244415
May 28, 2012 (JP) ................................. 2012-120654

(51) Int. Cl.
*F02M 25/07* (2006.01)

(52) U.S. Cl.
CPC ............ *F02M 25/0773* (2013.01); *Y02T 10/121* (2013.01); *F02M 25/0788* (2013.01)

(58) Field of Classification Search
CPC .......... F02M 25/0772; F02M 25/0773; F02M 25/0788; F02M 25/0793; F16K 31/04
See application file for complete search history.

(56) References Cited

U.S. PATENT DOCUMENTS

| | | | | |
|---|---|---|---|---|
| 6,102,016 A | * | 8/2000 | Sitar et al. | ................. 123/568.23 |
| 8,690,122 B2 | * | 4/2014 | Kato et al. | ..................... 251/267 |
| 2012/0325183 A1 | * | 12/2012 | Hatano | .................... 123/568.11 |
| 2014/0020665 A1 | * | 1/2014 | Yoshioka | ................. 123/568.24 |
| 2014/0290239 A1 | * | 10/2014 | Akita et al. | ..................... 60/602 |

FOREIGN PATENT DOCUMENTS

| | | | |
|---|---|---|---|
| JP | A-2000-002159 | | 1/2000 |
| JP | A-2001-020809 | | 1/2001 |
| JP | 2008202516 A | * | 9/2008 |
| JP | A-2008-202516 | | 9/2008 |

\* cited by examiner

*Primary Examiner* — Thomas Moulis
*Assistant Examiner* — Elizabeth Hadley
(74) *Attorney, Agent, or Firm* — Oliff PLC (57) ABSTRACT

In an EGR valve, an actuator includes a coil, a rotor body to be driven to rotate when the coil is energized with electric current, and a converting mechanism to convert rotational movement of the rotor body into stroke movement of the rod to bring a valve into or out of contact with a seat. The rod includes a stopper that will contact with a protrusion of the rotor body when the valve is placed in a full closed state. An end face of the stopper and an end face of the protrusion are slanted with respect to a stroke direction of stroke movement of the rod.

4 Claims, 11 Drawing Sheets

FIG.1

Exhaust Gas

EXHAUST GAS RECIRCULATION APPARATUS

CROSS-REFERENCE TO RELATED APPLICATIONS

This application is based upon and claims the benefit of priority from the prior Japanese Patent Applications Nos. 2011-244415 filed on Nov. 8, 2011 and 2012-120654 filed on May 28, 2012, the entire contents of which are incorporated herein by reference.

BACKGROUND OF THE INVENTION

1. Field of the Invention

The present invention relates to an exhaust gas recirculation apparatus configured to open and close a valve by operation of an actuator to return or recirculate a part of exhaust gas discharged from an engine to an intake system.

2. Related Art

Heretofore, a part of exhaust gas discharged from an engine is recirculated to an intake system. An exhaust gas recirculation apparatus is thus used to control recirculating the exhaust gas to the intake system. In this exhaust gas recirculation apparatus, for example, the actuator is drivingly controlled to move up and down a valve provided at one end of a drive shaft to adjust an opening degree of the valve, thereby controlling an amount of exhaust gas to be returned to the intake system.

As one example of such an exhaust gas recirculation apparatus, Patent Document 1 discloses an exhaust gas recirculation apparatus configured to prevent inflow of exhaust gas to an intake passage while an actuator is not driven and a valve part is closed by an urging force of a spring.

RELATED ART DOCUMENTS

Patent Documents

Patent Document 1: JP-A-2008-202516

SUMMARY OF INVENTION

Problems to be Solved by the Invention

However, in the case where the exhaust gas recirculation apparatus of Patent Document 1 is used in a turbo engine, the pressure on an intake pipe side in the exhaust gas recirculation apparatus may rise more than the pressure on an exhaust pipe side while the valve part is closed. As the force deriving from the pressure applied from the intake pipe side and acting on the valve part becomes larger than the urging force of the spring, the valve part is made to open, thus allowing intake air to flow to the exhaust pipe side. This is a loss of the intake air to be fed into a combustion chamber of an engine and hence leads to a decrease in engine power.

When the urging force of the spring is to be made larger to prevent such a defect, a drive torque of the actuator (a motor) also has to be increased accordingly.

Thus, the size of the actuator tends to increase. This results in size increase of the exhaust gas recirculation apparatus. Such a large exhaust gas recirculation apparatus is subjected to many restrictions when mounted in a vehicle, for example, difficulty in ensuring a mounting space of the exhaust gas recirculation apparatus in the vehicle.

Therefore, the present invention has been made to solve the above problems and has a purpose to provide an exhaust gas recirculation apparatus capable of restraining a valve from opening even when the valve receives a pressure from an intake system side of an engine larger than a force that maintains the valve in a full closed state (e.g., a pressure larger than an urging force of a spring) without increasing the size of the apparatus.

Means of Solving the Problems

To achieve the above purpose, one aspect of the invention provides an exhaust recirculation apparatus including: a housing formed with an inlet port to take in exhaust gas discharged from an engine, an outlet port to discharge a part of the exhaust gas to an intake system of an engine so that the exhaust gas is mixed in intake air, and a communication passage to communicate the inlet port and the outlet port; a seat provided in the communication passage; a drive shaft having one end on which a valve is attached, the valve being configured to come into and out of contact with the seat; and an actuator to move the valve through the drive shaft, wherein the actuator includes: a coil; a rotor to be driven to rotate when the coil is energized with electric current; and a converting mechanism to convert rotational movement of the rotor into stroke movement of the drive shaft to bring the valve into contact or out of contact with the seat, wherein the drive shaft includes a stopper configured to contact with a protrusion of the rotor when the valve is placed in a full closed state, and wherein the stopper includes an end face that will contact with the protrusion and the protrusion includes an end face that will contact with the stopper, each of the end faces being slanted with respect to a stroke direction of stroke movement of the drive shaft.

According to the above configuration, the actuator includes the coil, the rotor to be driven to rotate when the coil is energized with electric current, and the converting mechanism for converting rotational movement of the rotor into stroke (linear) movement of the drive shaft to bring the valve into and out of contact with the seat. The drive shaft includes the stopper that will contact with the protrusion of the rotor when the valve is placed in a full closed state. The end face of the stopper and the end face of the protrusion, which will contact with each other, are slanted to a stroke direction of the stroke movement of the drive shaft. Accordingly, a component force of the reaction force generated in the stopper by the rotary torque of the rotor acts in a direction to bring the valve into contact with the seat. This can prevent the valve from opening even when the pressure in the communication passage increases. Since a large urging force of an elastic element or the like is not required to urge the valve in a closing direction, the actuator does not need to be increased in size and thus size increase of the exhaust gas recirculation apparatus can be prevented. Therefore, the exhaust gas recirculation apparatus, without being increased in size, can restrain the valve from opening even when the valve is subjected to a pressure from the intake system side of the engine larger than the force that maintains the valve in the full closed state.

Effects of the Invention

According to the exhaust gas recirculation apparatus of the invention, the apparatus is not increased in size and can prevent the valve from opening even when the pressure larger than the force that maintains the full closed state of the valve from the intake system side of the engine, e.g., the pressure larger than the urging force of the spring, is applied to the valve.

DESCRIPTION OF EMBODIMENTS

A detailed description of a preferred embodiment of the present invention will now be given referring to the accompanying drawings.

<Intake-Exhaust System of Internal Combustion Engine>

Figure 1:
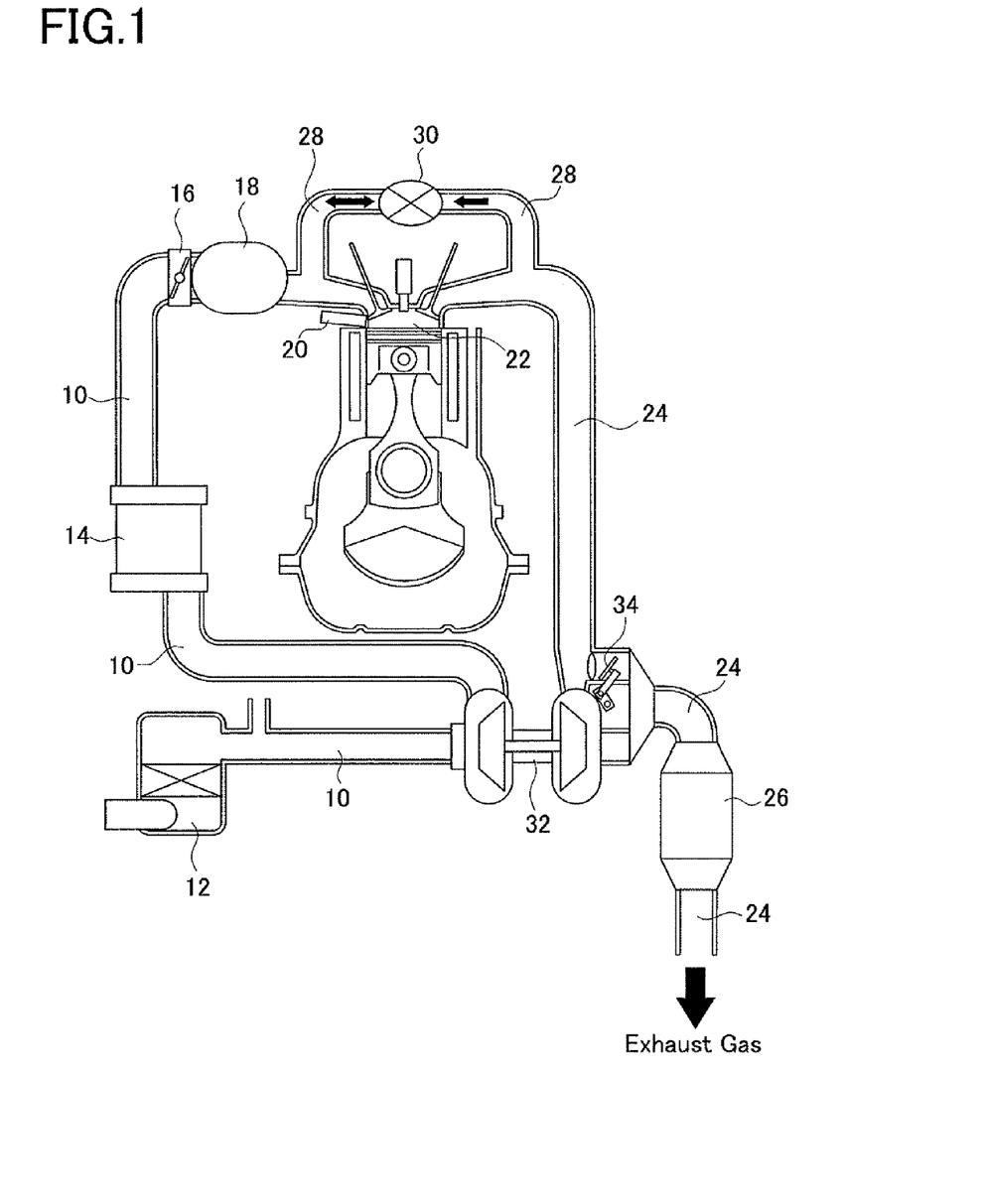
FIG. 1 is an overall configuration view of an intake-exhaust system of an engine.

An intake-exhaust system of an internal combustion engine using an exhaust gas recirculation apparatus of the present embodiment will be explained first. FIG. 1 is an overall configuration view of the intake-exhaust system of an engine (the internal combustion engine).

As shown in FIG. 1, the intake-exhaust system of the engine includes an intake passage 10, an air cleaner 12, an intercooler 14, a throttle valve 16, a surge tank 18, a direct-injection injector 20, a combustion chamber 22, an exhaust passage 24, a catalytic converter 26, an exhaust recirculation passage 28, an EGR valve 30, a turbocharger (a supercharger) 32, a WIG (waste gate) valve 34, and others.

The above intake-exhaust system of the engine operates to supply intake air (atmosphere) to the combustion chamber 22 via the intake passage 10, and the air cleaner 12 and the intercooler 14 provided on the intake passage 10. The throttle valve 16 and the surge tank 18 are placed between the intake passage 10 and the combustion chamber 22. Fuel is supplied from the direct-injection injector 20 into the combustion chamber 22. Exhaust gas discharged from the combustion chamber 22 is exhausted to the outside via the catalytic converter 26 and an exhaust muffler (not shown) provided in the exhaust passage 24. Further, a part of the exhaust gas is recirculated to the exhaust recirculation passage 28 branched from a midpoint of the exhaust passage 24 and connected to a midpoint of the intake passage 10. In this exhaust recirculation passage 28, the EGR valve 30 which is one example of the exhaust gas recirculation apparatus of the invention is placed. The details of the EGR valve 30 will be described later.

The turbocharger 32 is placed to be driven by the exhaust gas to be discharged through the exhaust passage 24 and supply supercharged intake air in the intake passage 10. The intake air pressurized by the turbocharger 32 is supplied to the combustion chamber 22 through the intake passage 10 and also this supercharging pressure is applied to an outlet port 52 (see FIG. 2) and a communication passage 54 (see FIG. 2) of the EGR valve 30 through the exhaust recirculation passage 28.

<Exhaust Gas Recirculation Apparatus>

Next, the EGR valve 30, one example of the exhaust gas recirculation apparatus of the invention, will be explained below.

Example 1

Figure 2:
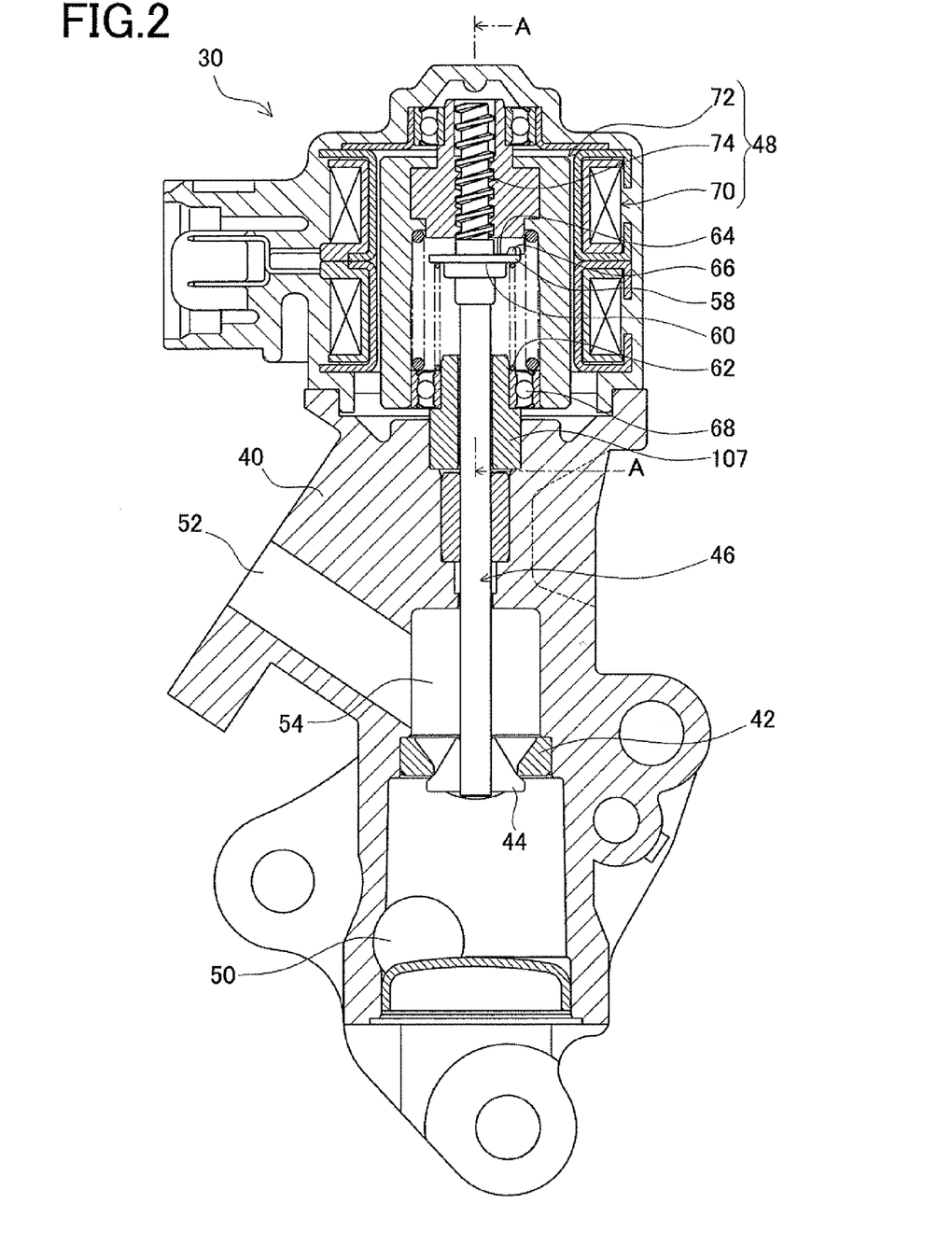
FIG. 2 is a cross sectional view showing a schematic configuration of an EGR valve of Example 1.
Figure 3:
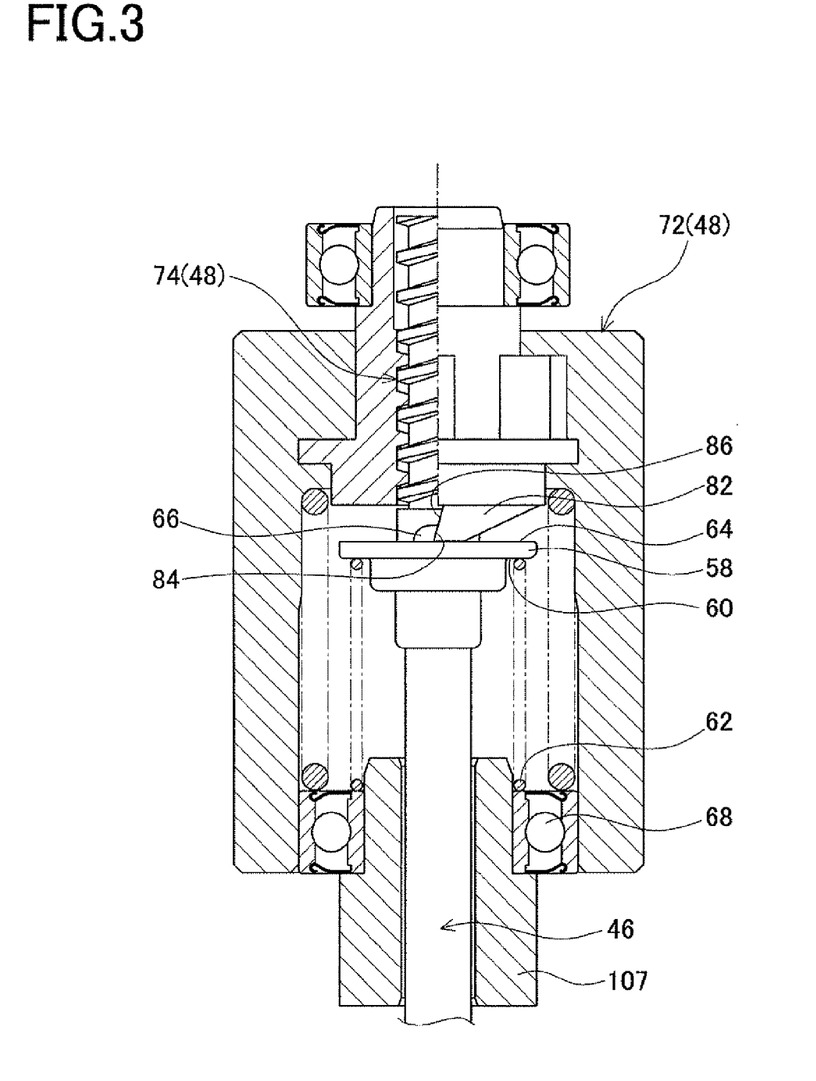
FIG. 3 is a cross sectional view (an enlarged view) taken along a line A-A in FIG. 2.
Figure 4:
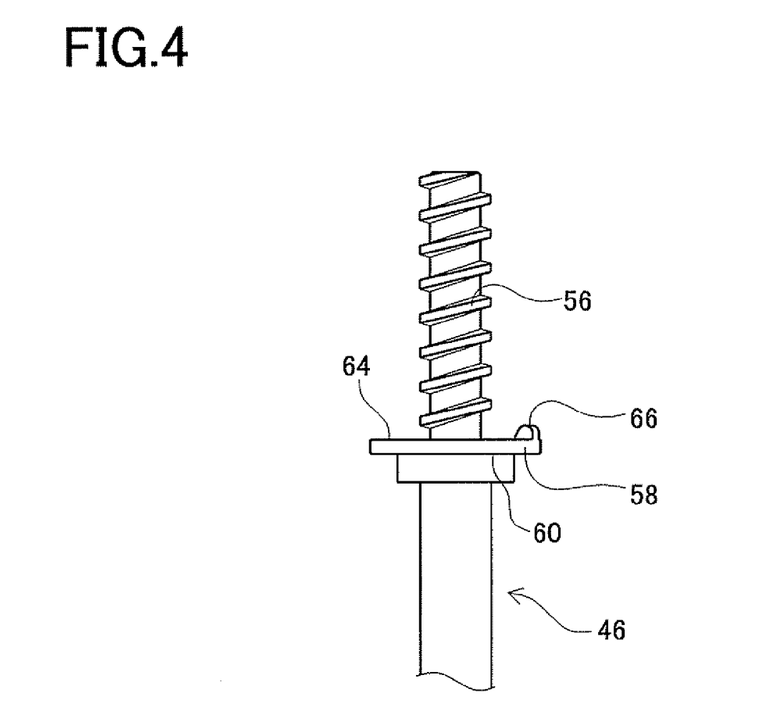
FIG. 4 is a front view showing a schematic configuration of a rod.
Figure 5:
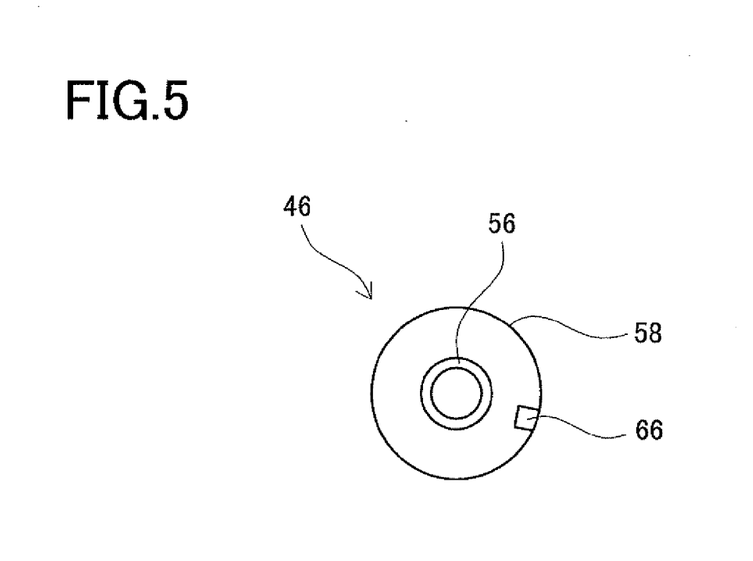
FIG. 5 is a top view showing the schematic configuration of the rod.
Figure 6:
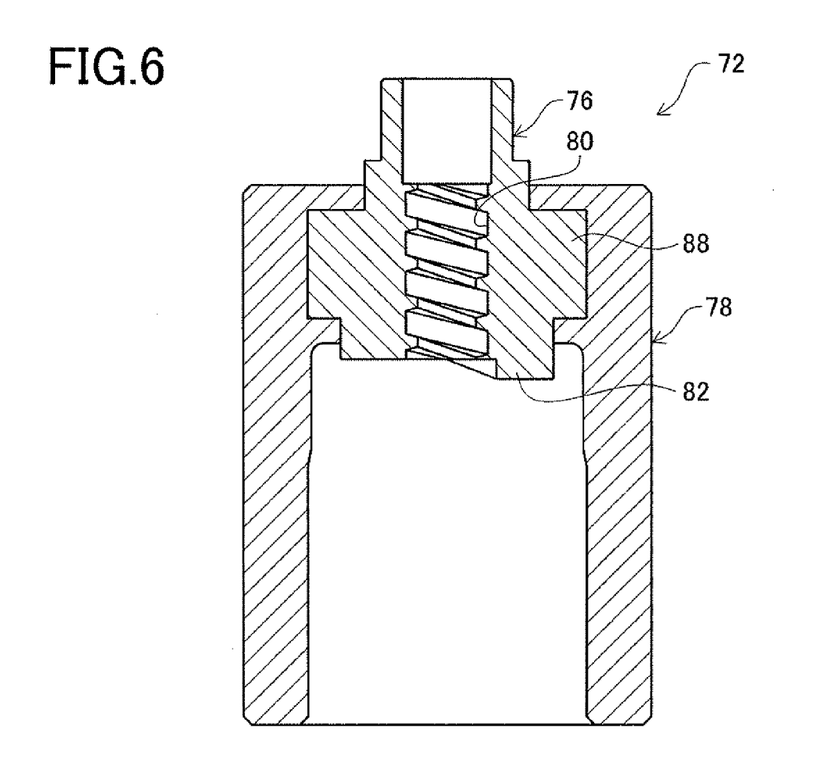
FIG. 6 is a cross sectional view showing a schematic configuration of a rotor body.
Figure 7:
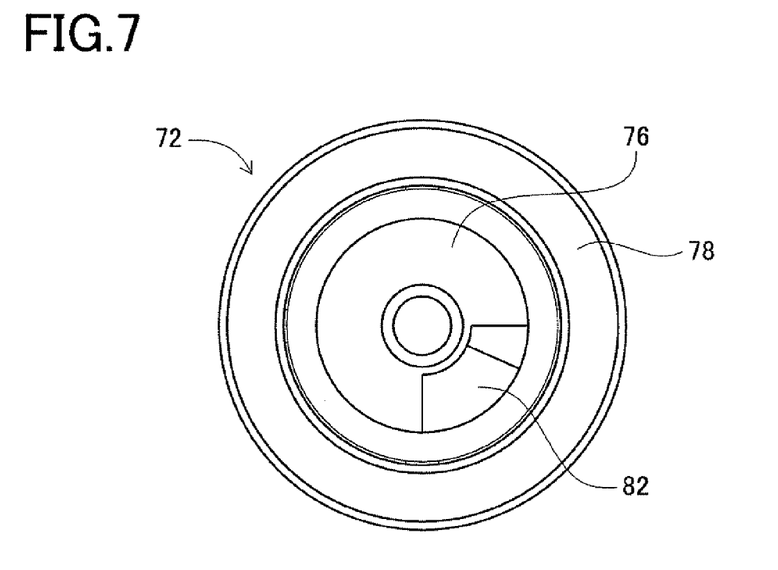
FIG. 7 is a bottom view of the rotor body.
Figure 8:
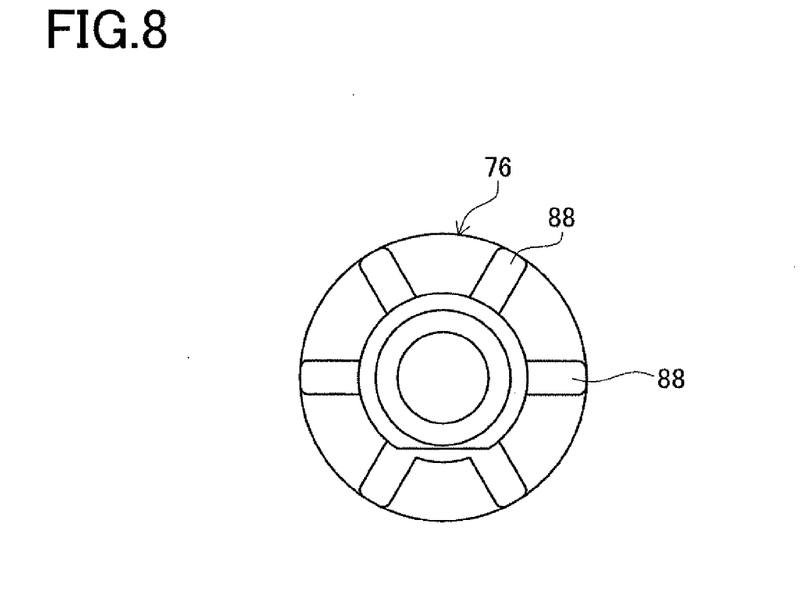
FIG. 8 is a top view showing a schematic configuration of a guide.
Figure 9:
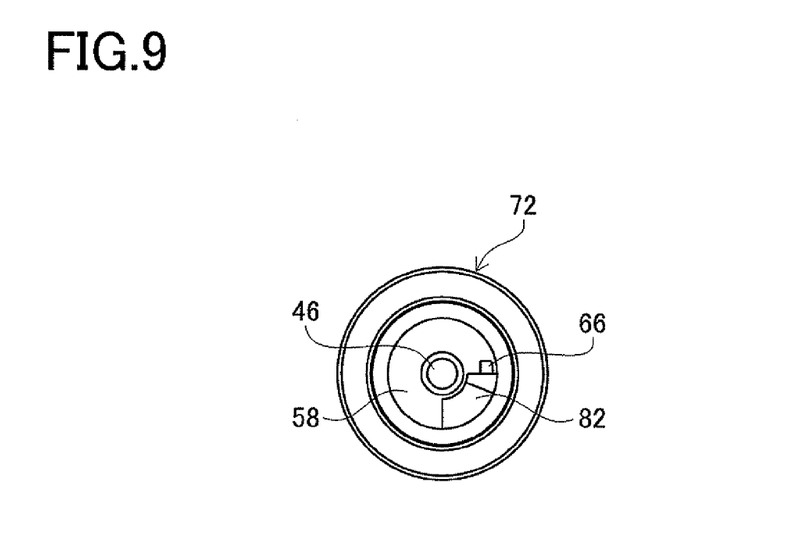
FIG. 9 is a view showing a positional relationship between the guide and the rod when a valve is in a full closed state.

Firstly, Example 1 is explained. FIG. 2 is a cross sectional view showing a schematic configuration of the EGR valve 30 of this example. FIG. 3 is a cross sectional view (an enlarged view) taken along a line A-A in FIG. 2. FIG. 4 is a front view showing a schematic configuration of a rod. FIG. 5 is a top view showing the schematic configuration of the rod. FIG. 6 is a cross sectional view showing a schematic configuration of a rotor body. FIG. 7 is a bottom view of the rotor body. FIG. 8 is a top view showing a schematic configuration of a guide. FIG. 9 is a view showing a positional relationship between the guide and the rod when a valve is in a full closed state. The full closed state in the present embodiment represents a state of the valve moved by rotation of the rotor body until the valve contacts with a seat once and then an end face of a stopper of the rod abuts on an end face of a protrusion of the guide, as described later.

As shown in FIGS. 2 and 3, the EGR valve 30 includes a housing 40, a seat 42, a valve 44, a rod 46, an actuator 48, and others.

The housing 40 includes an inlet port 50, the outlet port 52, the communication passage 54, and others. The inlet port 50 is an opening through which EGR (Exhaust Gas Recirculation) gas is to be introduced from the exhaust recirculation passage 28 (see FIG. 1) into the EGR valve 30. The EGR gas is a part of the exhaust gas recirculated from the exhaust passage 24. The outlet port 52 is an opening through which the EGR gas is to be discharged out of the EGR valve 30.

The communication passage 54 is a passage communicating between the inlet port 50 and the outlet port 52. In this communication passage 54, there is provided the seat 42 with which the valve 44 is brought into and out of contact with the seat 42.

The valve 44 is attached to the rod 46 extending into the actuator 48 (upward in FIG. 2) and is movable in the housing 40. The rod 46 is one example of a "drive shaft" of the present invention. The rod 46 includes, at one end (an upper end in FIG. 2), a male screw section 56 formed with external threads on an outer periphery as shown in FIG. 4. The rod 46 further includes a spring retainer 58 near an end (a lower end in FIG. 4) of the male screw section 56 on the valve 44 side. This spring retainer 58 has a first surface 60 (a lower surface in FIG. 4) served as a support face to receive a spring 62 (see FIG. 2). The spring retainer 58 is formed with a stopper 66 as shown in FIG. 4 on a second surface 64 (an upper surface in FIG. 4). The stopper 66 is configured to abut on a protrusion 82 of a rotor body 72 (see FIG. 3) mentioned later when the valve 44 is placed in a full closed state to restrict an initial position of the rod 46.

Referring back to FIG. 2, the valve 44 is of a cone shape having a conical surface that will contact with or separate from the seat 42. This valve 44 is urged toward the actuator 48 (upward in FIG. 2) by the spring 62 placed between the spring retainer 58 and the housing 40 (concretely, a bearing 68). The valve 44 will be driven or moved (up and down in FIG. 2) by operation of the actuator 48. In this way, the valve 44 is brought into or out of contact with the seat 42 to shut or open the communication passage 54.

The actuator 48 includes, as shown in FIGS. 2 and 3, a coil 70, a rotor body 72, a converting mechanism 74, and others. When the coil 70 is energized with electric current, the rotor body 72 is driven to rotate by an amount (angle) corresponding to a predetermined number of steps. The converting mechanism 74 is configured to convert rotational movement of the rotor body 72 into stroke (linear) movement of the rod 46 to move the valve 44 into or out of contact with the seat 42.

The rotor body 72 consists of a resin guide 76 and an annular plastic magnet 78 as shown in FIG. 6. The guide 76 includes, at its center, a female screw section 80 threadedly engageable with the male screw section 56 of the rod 46. Accordingly, while the female screw section 80 of the guide 76 threadedly engages the male screw section 56 of the rod 46, the rotational movement of the guide 76 is converted into the stroke movement of the rod 46. Specifically, the male screw section 56 of the rod 46 and the female screw section 80 of the guide 76 constitute the converting mechanism 74. This can directly converts the rotational movement of the guide 76 into the stroke movement of the rod 46. The rotor body 72 is one example of a "rotor" of the invention.

As shown FIGS. 6 and 7, the guide 76 is formed with a protrusion 82 at an end (a lower end in FIG. 6) facing the spring retainer 58. When the valve 44 is brought into a full closed state, an end face 84 of the stopper 66 abuts on an end face 86 of the protrusion 82 as shown in FIGS. 3 and 9. The initial position of the rod 46 is thereby restricted. In the present embodiment, the initial position of the rod 46 is a reference position to control an opening degree of the valve 44 by operation of the actuator 48. This position corresponds to a position of the rod 46 in an axial direction when the valve 44 is placed in the full closed state.

When the valve 44 is in the full closed state, as shown in FIGS. 3 and 9, the end face 84 of the stopper 66 and the end face 86 of the protrusion 82 are placed in surface contact with each other. This surface contact between the end face 84 of the stopper 66 and the end face 86 of the protrusion 82 enhances contact strength between the stopper 66 and the protrusion 82. Accordingly, deformation of the stopper 66 and the protrusion 82 can be prevented. It is therefore possible to continuously keep a positional interrelationship between the initial position of the rod 46 serving as the reference for valve opening control by the actuator 48 and the rotation position (an initial position) of the guide 76 while the valve 44 is in the full closed position. The opening degree of the valve 44 can therefore be controlled accurately for a long term. This is because the opening control of the valve 44 is performed with reference to the positional interrelationship between the initial position of the rod 46 and the initial position of the guide 76 while the valve 44 is in the full closed. As the opening degree of the valve 44 can be controlled accurately for a long term as above, the control reliability of the EGR valve 30 can be enhanced.

Furthermore, the guide 76 is formed, on its outer periphery, with rotation stopper portions 88 each protruding radially outward as shown in FIGS. 6 and 8. In this example, the guide 76 is formed with six rotation stopper portions 88 circumferentially arranged at regular intervals. The annular plastic magnet 78 is formed outside and integral with the above guide 76 by insert molding, constituting the rotor body 72.

The following explanation is made to operations of the EGR valve 30 configured as above. Part of the exhaust gas discharged from the combustion chamber 22 into the exhaust passage 24 is allowed to flow through the exhaust recirculation passage 28 and introduced as EGR gas into the communication passage 54 through the inlet port 50 of the EGR valve 30. When the EGR gas is to be returned to the intake system of the engine, the rotor body 72 is rotated counterclockwise. Then, the rod 46 is moved downward in FIG. 2 through the male screw section 56 threadedly engaging in the female screw section 80 of the guide 76, thereby moving the valve 44 out of contact with the seat 42. This opens the communication passage 54 to allow communicate between the inlet port 50 and the outlet port 52. The EGR gas is thus discharged from the EGR valve 30 through the outlet port 52 into the intake system of the engine. Although not shown in FIG. 2, the rod 46 and the a bush 107 are provided with a rotation restricting section to prevent rotation of the rod 46, so that the rod 46 is moved up and down without rotating.

A flow rate of the EGR gas allowed to recirculated to the intake system of the engine is controlled by a distance between the valve 44 and the seat 42 (i.e., the valve opening degree). That is, the valve opening degree is controlled by changing a stroke amount of the rod 46.

When recirculation of the EGR gas to the intake system of the engine is to be stopped thereafter, the rotor body 72 is rotated clockwise. Thus, the rod 46 is moved upward in FIG. 2 through the male screw section 56 threadedly engaging in the female screw section 80 of the guide 76 by the torque of the rotor body 72 and the urging force of the spring 62. The valve 44 is then brought in contact with the seat 42, thereby shutting the communication passage 54 to block communication between the inlet port 50 and the outlet port 52. Thus, the EGR gas is not discharged from the outlet port 52, stopping the recirculation of EGR gas to the intake system of the engine.

When the recirculation of EGR gas to the intake system of the engine is to be stopped by moving the valve 44 into contact with the seat 42 as above, the rotor body 72 is further rotated after the valve 44 contacts with the seat 42. To be more specific, after the valve 44 contacts with the seat 42, the rotor body 72 is rotated until the end face 84 of the stopper 66 of the rod 46 abuts against the end face 86 of the protrusion 82 of the guide 76 as shown in FIGS. 2, 3, and 9. Thus, the valve 44 is placed in the full closed state.

In the present embodiment, when the valve 44 is placed in the full closed state as above, the male screw section 56 of the rod 46 and the female screw section 80 of the guide 76 are separated in the stroke direction of the rod 46, creating gaps between the male screw section 56 of the rod 46 and the female screw section 80 of the guide 76. By the urging force of the spring 62 that urges the valve 44 in a closing direction, the valve 44 is pressed against the seat 42 to maintain the full closed state of the valve 44.

Figure 10:
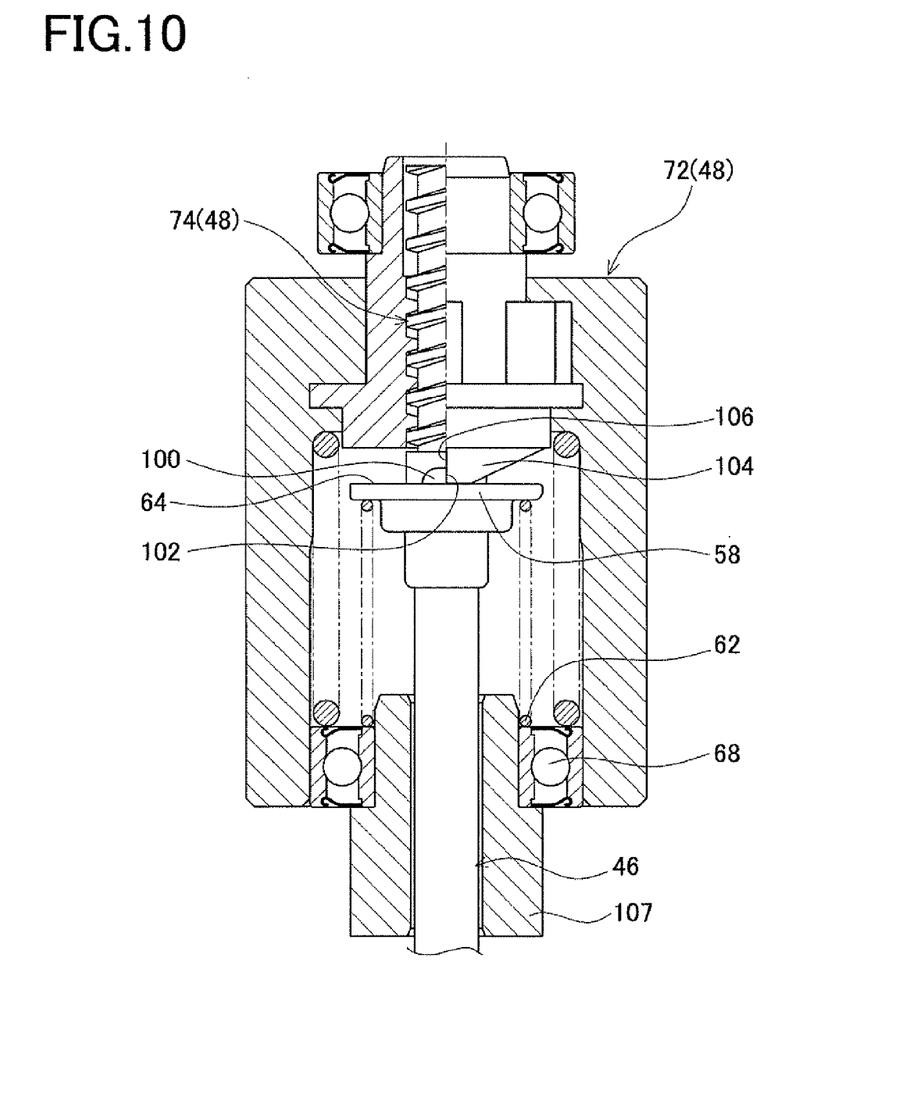
FIG. 10 is a view showing a case where an end face of a stopper and an end face of a protrusion are both formed to be vertical to an upper surface of a spring retainer.

In the EGR valve 30 installed in the intake-exhaust system of the engine including the turbocharger 32 shown in FIG. 1, there may be a case where the supercharging pressure acts on the communication passage 54 through the outlet port 52 and thus the pressure in the communication passage 54 rises more than the pressure in the inlet port 50. At that time, as an example shown in FIG. 10, for example, if an end face 102 of a stopper 100 and an end face 106 of a protrusion 104 are both formed to be vertical to the second surface 64 of the spring retainer 58, that is, if they are parallel to the stroke direction of stroke movement of the rod 46 (in an axial direction of the rod 46), the valve 44 is opened when the force acting on the valve 44 due to the pressure in the communication passage 54 increases more than the force of the spring 62.

In the present embodiment, in contrast, the stopper 66 and the protrusion 82 are each tapered. In other words, both the end face 84 of the stopper 66 and the end face 86 of the protrusion 82 are slanted with respect to the stroke direction of stroke movement of the rod 46 (in the axial direction of the rod 46).

Figure 11:
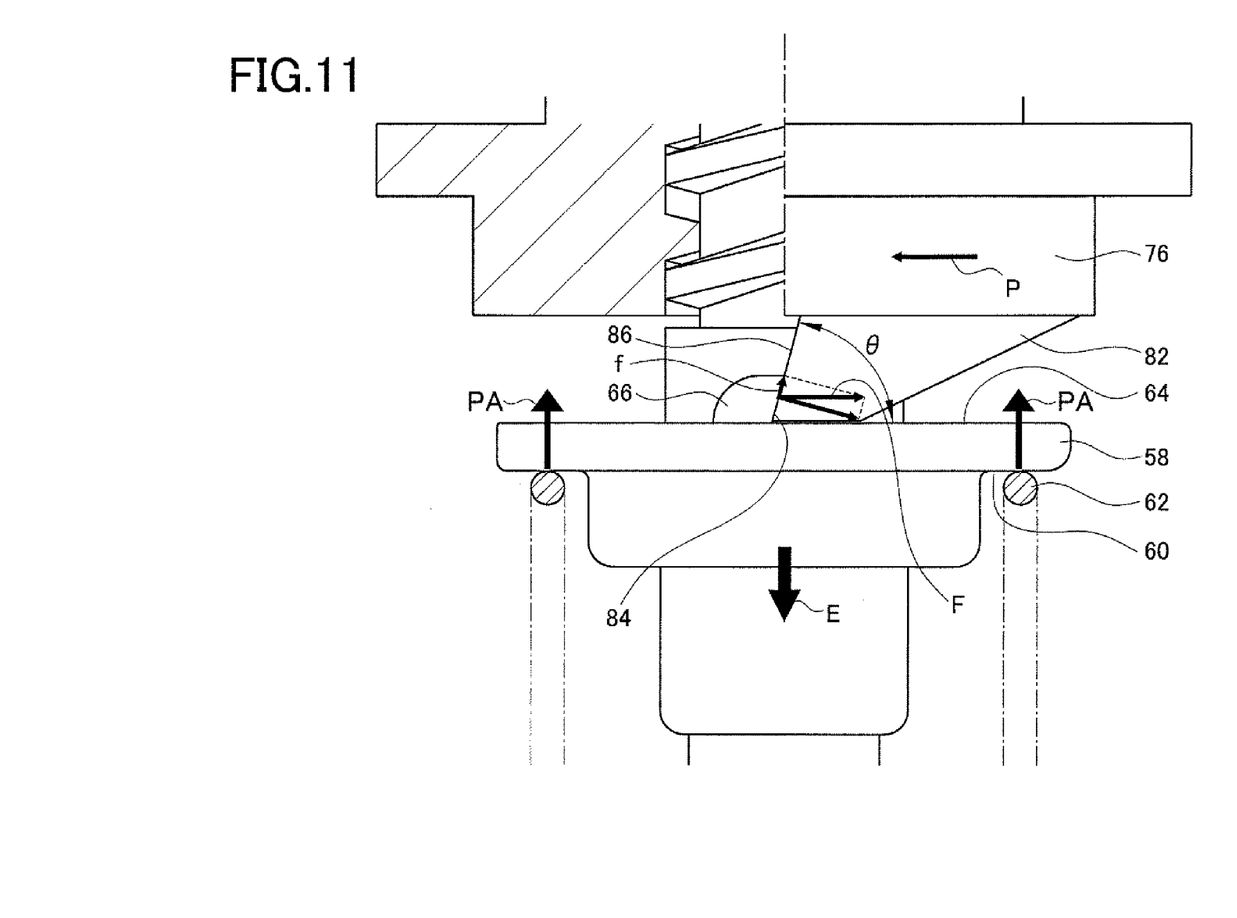
FIG. 11 is an enlarged view of the stopper and the protrusion and their surrounding parts in the EGR valve of Example 1.

As shown in FIG. 11 (an enlarged view showing the stopper 66 and the protrusion 82 and their surrounding parts), as the force P is applied by the rotary torque of the rotor body 72 to the end face 84 of the stopper 66 of the rod 46, the reaction force F (a force equal in magnitude but opposite in direction to the force P) is generated on the end face 84. In this example in which the end face 84 of the stopper 66 and the end face 86 of the protrusion 82 are both slanted, a component force f, in a slanting direction along the slant end face 84, of the reaction force F acts in a direction to push up the rod 46 to bring the valve 44 into contact with the seat 42. As above, the force to push up the rod 46 acts in addition to the urging force PA of the spring 62. Even when the supercharging pressure is applied in the outlet port 52, increasing the pressure in the communication passage 54, thereby forming a positive pressure in the communication passage 54, that is, even when a pressure larger than the urging force PA of the spring 62 (the pressure larger than the force that maintains the full closed state) is applied to the valve 44, the valve 44 is prevented from opening and is maintained in the full closed state. Since there is no need to increase the urging force PA of the spring 62, the actuator 48 is not required to generate a large torque. The actuator 48 also does not need to be increased in size. Accordingly, the EGR valve 30 is prevented from upsizing. In the above manner, the valve 44 can be restrained from opening even when the supercharging pressure is applied in the outlet port 52 without increasing the size of the EGR valve 30.

When the valve 44 is placed in the full closed state as described above, the end face 84 of the stopper 66 and the end face 86 of the protrusion 82 abut in surface contact with each other. Accordingly, the surface contact between the end face 84 of the stopper 66 and the end face 86 of the protrusion 82 improves contact strength between the end face 84 of the stopper 66 and the end face 86 of the protrusion 82. Even when the positive pressure is generated in the communication passage 54 in response to the supercharging pressure applied in the outlet port 52, therefore, the valve 44 can be prevented more reliably from opening and be maintained in the full closed state.

Herein, an explanation is given to necessary conditions to generate the force to move up the rod 46 in addition to the urging force PA of the spring 62 in order to maintain the valve 44 in the full closed state.

A load E (see FIG. 11) imposed on the rod 46 due to the supercharging pressure applied through the outlet port 52 is expressed as below:

$$E = C \times (S1 - S2) + m \times G \quad \text{(Ex. 1)}$$

where C denotes a pressure difference between the inside of the communication passage 54 and the inlet port 50, S1 denotes the area of an opening of the seat 42, S2 denotes the cross sectional area of the rod 46 in a radial direction, m denotes the weight of the rod 46 and the valve 44, and G denotes the engine vibration acceleration.

Furthermore, the force P (see FIG. 11) imposed on the end face 84 of the stopper 66 of the rod 46 by the rotary torque T of the rotor body 72 is expressed as below:

$$P = T \div L \quad \text{(Ex. 2)}$$

where L denotes a distance from the position of a central axis of the spring retainer 58 to the position of the stopper 66. To be specific, this is a distance in a radial direction of the spring retainer 58 from the position of the central axis of the spring retainer 58 to the outermost position of the stopper 66.

As the necessary conditions to maintain the valve 44 in the full closed state, the following two expressions both have to be established. Firstly, a relationship of the force in a slanting direction of the end face 84 of the stopper 66 has to be given by the following expression:

$$(E-PA) \times \sin\theta < [P \times \cos\theta + \mu \times \{(E-PA) \times \cos\theta + P \times \sin\theta\}] \quad \text{(Ex. 3)}$$

where PA denotes the urging force of the spring 62, θ denotes the inclination (angle) of the end face 84 of the stopper 66 and the end face 86 of the protrusion 82 to the second surface 64 of the spring retainer 58, and μ denotes a coefficient of friction between the end face 84 of the stopper 66 and the end face 86 of the protrusion 82.

Furthermore, a relationship of the force in a vertical direction to the end face 84 of the stopper 66 has to be given by the following expression:

$$(E-PA) \times \cos\theta < P \times \sin\theta \quad \text{(Ex. 4)}$$

The inclination θ is preferably set to be less than 90°. In this manner, with the inclination θ of less than 90°, the end face 84 of the stopper 66 and the end face 86 of the protrusion 82 are slanted in a direction opposite to the acting direction of the force P (i.e., to the right in FIG. 3) with respect to the stroke direction (up and down direction in FIG. 3) of the rod 46. Accordingly, it is possible to generate the component force f of the reaction force F generated by the rotary torque T of the rotor body 72, in a direction to bring the valve 44 into contact with the seat 42 more efficiently (in a direction to close the valve 44). Thus, even when the supercharging pressure is applied to the valve 44 through the outlet port 52, the valve 44 can be prevented more efficiently from opening.

Effects of Example 1

According to the EGR valve 30 of Example 1, the actuator 48 includes the coil 70, the rotor body 72 that will be driven to rotate when the coil 70 is energized with electric current, and the converting system 74 to convert the rotational movement of the rotor body 72 to the stroke movement of the rod 46 to bring the valve 44 into and out of contact with the seat 42. The rod 46 includes the stopper 66 that will abut against the protrusion 82 of the rotor body 72 when the valve 44 is placed in the full closed state. The end face 84 of the stopper 66 and the end face 86 of the protrusion 82 are each slanted with respect to the stroke direction of the stroke movement of the rod 46. In other words, the stopper 66 and the protrusion 82 are tapered.

Accordingly, the component force f of the reaction force F generated by the rotary torque T of the rotor body 72 acts in the direction to move up the rod 46 to bring the valve 44 into contact with the seat 42. Even when the pressure in the communication passage 54 increases, therefore, the valve 44 can be prevented from opening. Since it is unnecessary to increase the urging force PA of the spring 62, it is also unnecessary to increase the drive torque of the actuator 48. Thus, the size of the actuator 48 is not increased, so that the size of the EGR valve 30 is not increased. Consequently, without increasing the size of the EGR valve 30, the valve 44 can be prevented from opening even when the supercharging pressure is applied to the valve 44 from the intake system side of the engine.

When the valve 44 is placed in the full closed state, the end face 84 of the stopper 66 of the rod 46 is abutted on the end face 86 of the protrusion 82 of the rotor body 72, thereby easily restricting the initial position of the rod 46.

It is to be noted that the surface roughness degrees of the end face 84 of the stopper 66 and the end face 86 of the protrusion 82 are adjusted to increase a frictional force generated between the end face 84 of the stopper 66 and the end face 86 of the protrusion 82, so that the valve 44 can be prevented more reliably from opening.

The rod 46 includes the male screw section 56 and the rotor body 72 includes the female screw section 80 threadedly engaging the male screw section 56. When the valve 44 is placed in the full closed state, gaps are generated between the female screw section 80 and the male screw section 56 in the stroke direction of the rod 46. The valve 44 is urged by the spring 62 in the closing direction.

As above, the gaps are generated between the female screw section 80 and the male screw section 56 in the stroke direction of the rod 46 when the valve 44 is placed in the full closed state as above. The end face 84 of the stopper 66 and the end face 86 of the protrusion 82 each are slanted, so that the component force f is generated. This configuration can prevent opening of the valve 44 even when the supercharging pressure is applied from the intake system side of the engine to the outlet port 52 and the communication passage 54.

While the valve 44 is in the full closed state, furthermore, the end face 84 of the stopper 66 is in surface contact with the end face 86 of the protrusion 82. This enhances the contact strength between the end face 84 of the stopper 66 and the end face 86 of the protrusion 82. Accordingly, even when the pressure in the communication passage 54 rises, the valve 44 can be prevented more reliably from opening. The valve 44 can thus be prevented more reliably from opening even when subjected to the supercharging pressure applied from the intake side.

Example 2

Figure 12:
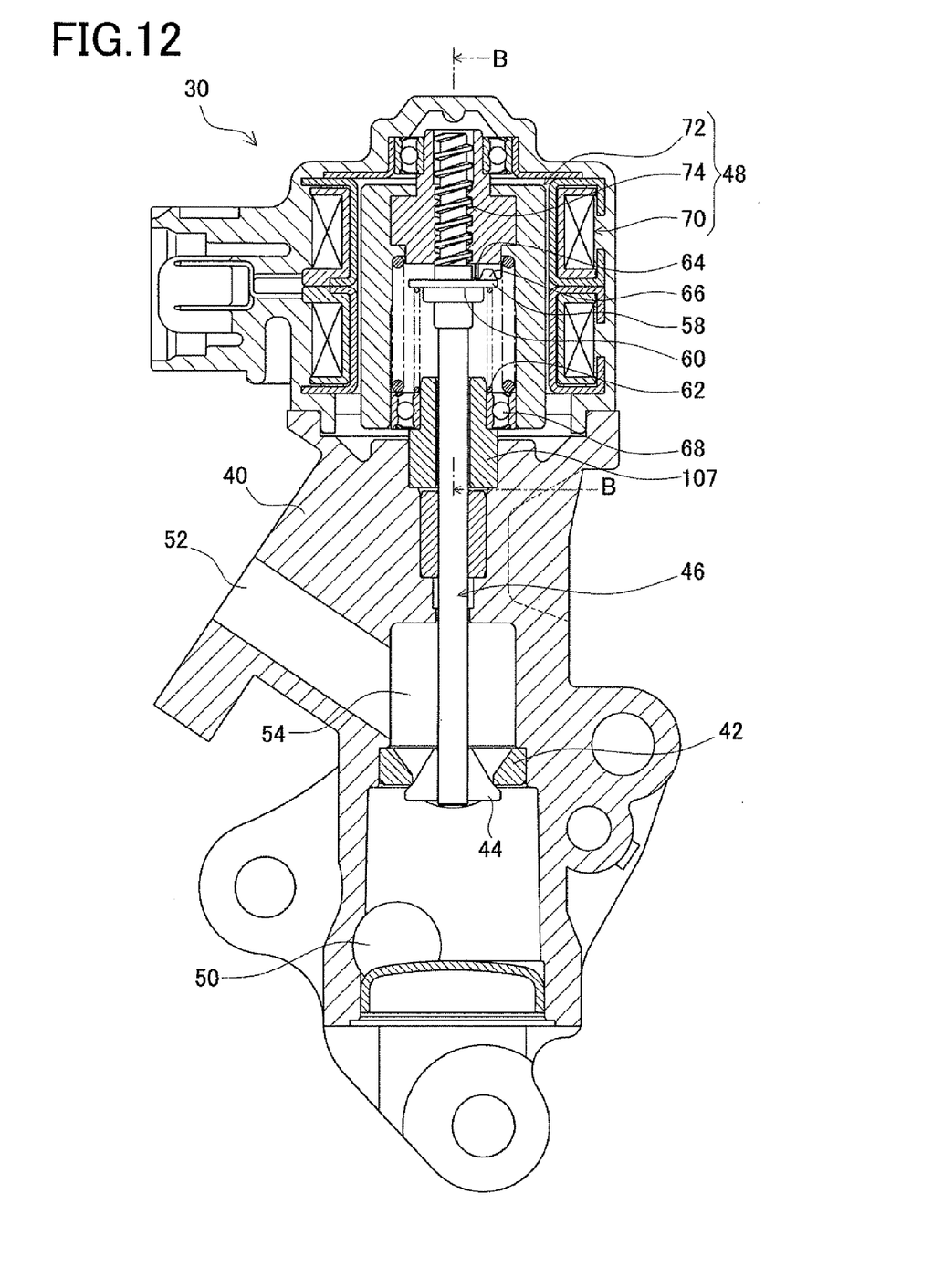
FIG. 12 is a cross sectional view showing a schematic configuration of an EGR valve of Example 2.
Figure 13:
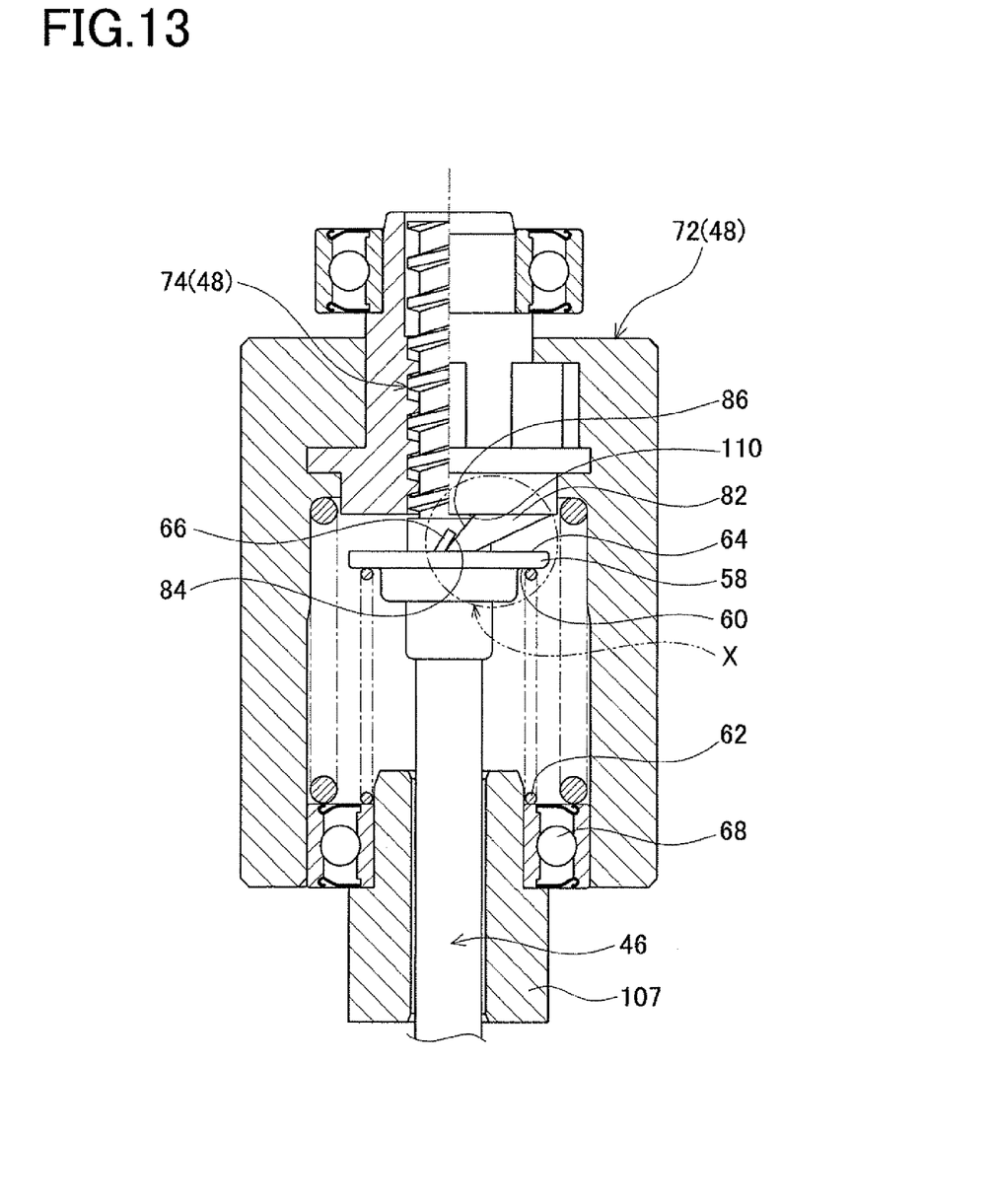
FIG. 13 is a cross sectional view (an enlarged view) taken along a line B-B in FIG. 12.
Figure 14:
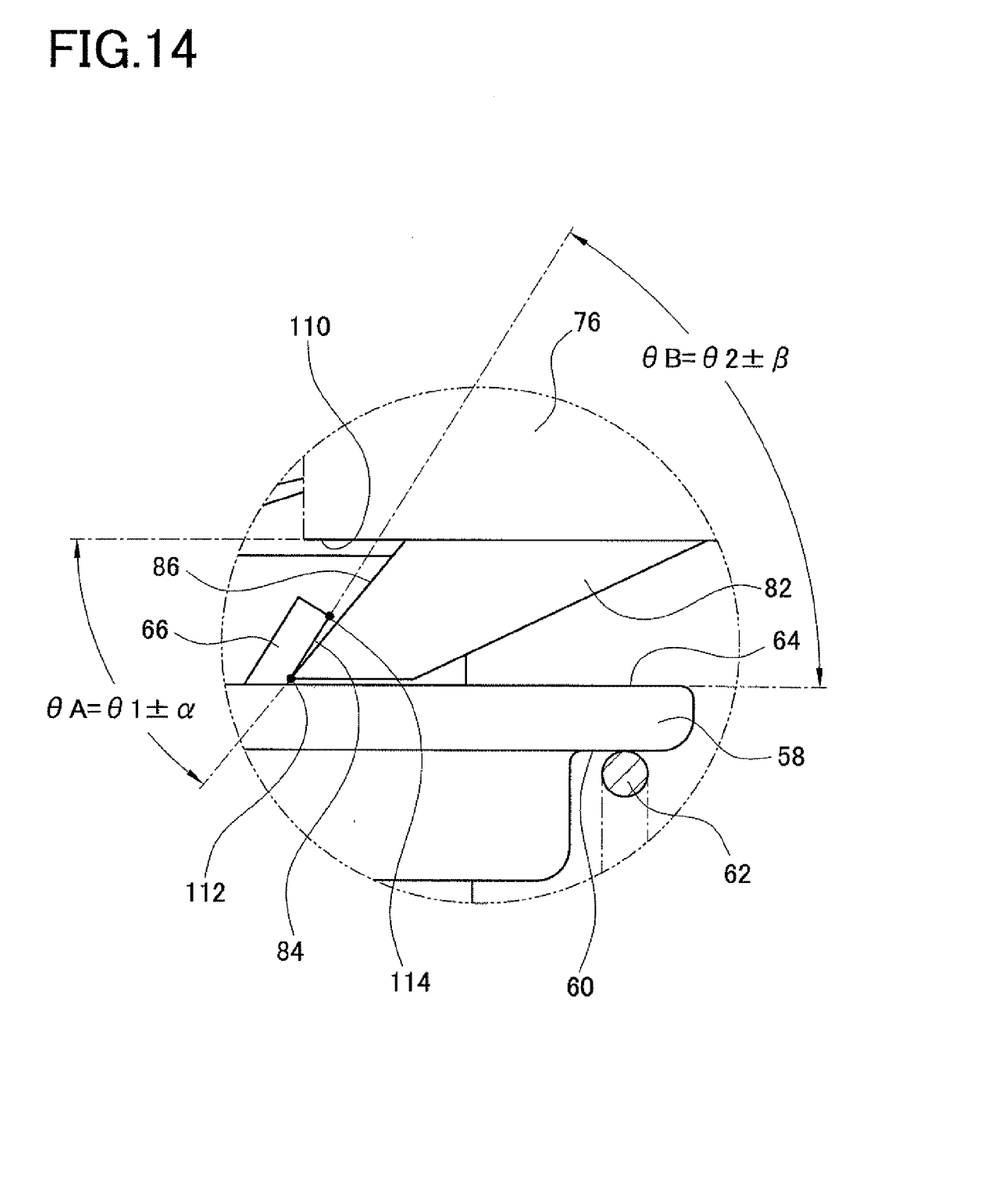
FIG. 14 is an enlarged view of a region X in FIG. 13.

Example 2 is explained below with a focus on differences from Example 1. Identical or similar parts to those in Example 1 are given the same reference signs and their details are not repeatedly explained below. FIG. 12 is a cross sectional view showing a schematic configuration of an EGR valve 30 in Example 2. FIG. 13 is a cross sectional view (an enlarged view) taken along a line B-B in FIG. 12. FIG. 14 is an enlarged view of a region X in FIG. 13.

In this example, the stopper 66 is made of for example stainless steel (SUS) and the protrusion 82 is made of for example polyphenylene sulfide resin (PPS), so that the strength of the protrusion 82 is lower than the strength of the stopper 66. As shown in FIGS. 13 and 14, assuming that an angle θA between the end face 86 of the protrusion 82 and an end face 110 of the guide 76 facing the spring retainer 58 is θ1±α, while an angle θB between the end face 84 of the stopper 66 and the second surface 64 of the spring retainer 58 is θ2±β, the angles θA and θB are determined to meet the condition: (θ1+α)≤(θ2−β).

In the present example, the condition that a maximum value of the angle θA is smaller than a minimum value of the angle θB is satisfied. In the above condition, α and β are dimensional tolerances. The end face 110 of the guide 76 of the rotor body 72 is perpendicular to the stroke direction of the rod 46. The second surface 64 of the spring retainer 58 of the rod 46 is perpendicular to the stroke direction of the rod 46.

According to the EGR valve 30 in the present example as described above, the angle θA (=θ1±α) between the end face 86 of the protrusion 82 and the end face 110 of the guide 76 is equal to or smaller than the angle θB (=θ2±β) between the end face 84 of the stopper 66 and the second surface 64 of the spring retainer 58. Specifically, even when the dimensional tolerances α and β are considered, the angle θA is determined to be equal to or smaller than the angle θB.

Accordingly, when the end face 84 of the stopper 66 contacts with the end face 86 of the protrusion 82 and the valve 44 is placed in the full closed state, either an edge 112 at a leading end of the end face 86 of the protrusion 82 abuts on the end face 84 f of the stopper 66 or the end face 84 of the stopper 66 comes into surface contact with the end face 86 of the protrusion 82. However, an edge 114 at a leading end of the end face 84 of the stopper 66 does not contact with the end face 86 of the protrusion 82. This can avoid stress concentration caused when the edge 114 of the stopper 66 contacts with the end face 86 of the protrusion 82. Consequently, durability of the protrusion 82 can be maintained against an impact force caused when the protrusion 82 abuts on the stopper 66.

The above embodiment is a mere example and does not restrict the present invention. The present invention may be embodied in other specific forms without departing from the essential characteristics thereof.

The invention claimed is:

1. An exhaust recirculation apparatus including:
   a housing formed with an inlet port to take in exhaust gas discharged from an engine, an outlet port to discharge a part of the exhaust gas to an intake system of an engine so that the exhaust gas is mixed in intake air, and a communication passage to communicate the inlet port and the outlet port;
   a seat provided in the communication passage;
   a drive shaft having one end on which a valve is attached, the valve being configured to come into and out of contact with the seat; and
   an actuator to move the valve through the drive shaft,
   wherein the actuator includes:
      a coil;
      a rotor to be driven to rotate when the coil is energized with electric current; and
      a converting mechanism to convert rotational movement of the rotor into stroke movement of the drive shaft to bring the valve into contact or out of contact with the seat,
   wherein the drive shaft includes a stopper configured to contact with a protrusion of the rotor when the valve is placed in a full closed state, and
   wherein the stopper includes an end face that will contact with the protrusion and the protrusion includes an end face that will contact with the stopper, each of the end faces being slanted with respect to a stroke direction of stroke movement of the drive shaft.

2. The exhaust gas recirculation apparatus according to claim 1,
   wherein the drive shaft includes a male screw section,
   the rotor includes a female screw section threadedly engaging the male screw section, and
   the female screw section and the male screw section are configured to generate gaps therebetween in the stroke direction when the valve is in the full closed state, and the valve is urged in a closing direction by an elastic element.

3. The exhaust gas recirculation apparatus according to claim 1, wherein an angle between the end face of the protrusion and a surface perpendicular to the stroke direction is equal to or smaller than an angle between the end face of the stopper and the surface perpendicular to the stroke direction.

4. The exhaust gas recirculation apparatus according to claim 2, wherein an angle between the end face of the protrusion and a surface perpendicular to the stroke direction is equal to or smaller than an angle between the end face of the stopper and the surface perpendicular to the stroke direction.

\* \* \* \* \*